United States Patent [19]

Sterrett

[11] Patent Number: 5,174,024

[45] Date of Patent: Dec. 29, 1992

[54] TAIL ROTOR ABRASIVE STRIP

[76] Inventor: Terry L. Sterrett, Post Fach 132, Pfaffikonerstr. 3, 8834, Schindellegi, Switzerland

[21] Appl. No.: 583,093

[22] Filed: Sep. 17, 1990

[51] Int. Cl.$^5$ .............................................. B64C 11/26
[52] U.S. Cl. .................................. 29/889.71; 411/224
[58] Field of Search ............ 416/224; 29/889.6, 889.7, 29/889.71

[56] References Cited

U.S. PATENT DOCUMENTS

| 1,860,557 | 5/1932 | Sukohl | 416/224 |
| 2,470,056 | 5/1949 | Seibel | 416/224 |
| 2,767,461 | 10/1956 | Lebold | 29/889.6 |
| 3,762,835 | 10/1973 | Carlson | 29/889.71 |
| 3,928,901 | 12/1975 | Schilling | 29/889.71 |
| 4,318,672 | 3/1982 | Hansen | 416/224 |
| 4,842,663 | 6/1989 | Kramer | 416/224 |
| 4,990,205 | 2/1991 | Barbier | 29/889.6 |

FOREIGN PATENT DOCUMENTS 1110217  4/1968  United Kingdom ................ 416/224

Primary Examiner—Edward K. Look
Assistant Examiner—James A. Larson
Attorney, Agent, or Firm—Marjama & Pincelli

[57] ABSTRACT

An improved rotor blade assembly and method of making same. The rotor blade includes protective layers which comprise a metal tail having a mesh bonded to its inside surface. The protective layer is pre-shaped and applied to the forward surface of the blade.

7 Claims, 1 Drawing Sheet

TAIL ROTOR ABRASIVE STRIP

This invention relates to rotor blades for aircraft.

BACKGROUND OF THE INVENTION

Helicopter rotor blades, and in particular tail rotor blades are prone to failure due to abrasion caused by particulate matter present in the air. Many methods have been tried so as to prolong the life of the tail rotor assemblies. These methods include adhesively bonding stainless steel strips to the leading sections of the tail rotor blade. The abrasion strip is used as a sacrificial layer which is to be replaced as it wears away with usage. These rotor blades are subject to quite extensive stresses and it is important that the bonding between the abrasion strip and the rotor blade be effective to withstand the stresses developed. A problem with such prior art abrasion strips is that the adhesive bonding of the stainless is quite difficult to obtain and is quite commonly the source of premature failure due to the adhesive failure between the abrasion strip and the rotor blade. The debonding of the abrasion strip from the rotor blade can result in catastrophic failure of the rotor blade assembly and/or gear box due to an imbalance condition of the rotor blade.

Prior art strips are adhered to the rotor blades by an adhesive system which typically depends upon an oxide film generated by acid etching. However, oxide films are typically very unstable, are typically unevenly formed, can cause corrosion and/or unfavorable surface finishes. Such techniques for bonding stainless steel to typical aluminum blades have been shown to be insufficient for the rigors of flight and the severe environment to which the rotor blades are subjected.

The present invention provides an improved rotor blade having an abrasion strip which provides improved bonding between the abrasion strip and rotor blade. The abrasion strip is in turn bonded to the rotor blade.

SUMMARY OF THE INVENTION

In one aspect of the present invention, there is provided a protective layer designed to be secured to the forward surface of an aircraft blade. The protective layer comprises an outer metal foil and a mesh bonded to the inside surface of the foil.

In another aspect of the present invention, there is provided a rotor blade assembly comprising a rotor blade and a protective layer secured to the forward surface of the rotor blade. The protective layer includes an outer metal foil and a woven steel mesh bonded to the inside surface of the foil.

In yet another aspect of the present invention, there is provided a method of providing a protective layer to a aircraft blade. The method includes the steps of:

a) providing a protective layer which comprises a metal foil layer and a mesh layer bonded to the inside surface of the foil;

b) cleaning said foil and mesh to remove any oils or residues present thereon;

c) preparing the area of the blade on which said layer is to be applied;

d) applying an adhesive to said blade and rotor blade;

e) applying said protective layer to said blade; and f) allowing said adhesive to cure.

DETAILED DESCRIPTION OF THE DRAWINGS

Figure 1:
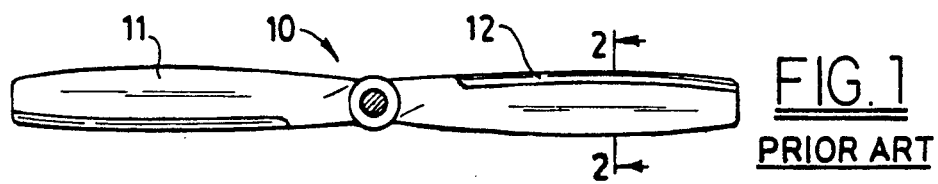
Referring to FIG. 1, there is illustrated a tail rotor blade assembly of the prior art.
Figure 2:
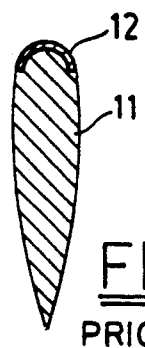
FIG. 2 is a cross-sectional view of the blade of FIG. 1 illustrating a stainless steel abrasion strip bonded to an aluminum rotor blade.
Figure 3:
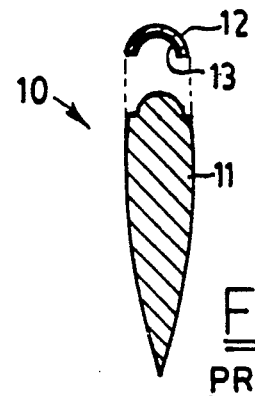
FIG. 3 is an exploded cross sectional view of the rotor blade of FIG. 2 illustrating adhesive strip prior to bonding to the blade.

Referring to FIGS. 1-3, there is illustrated rotor blade 10 assembly typical of the prior art. In particular, rotor blade assembly 10 is a tail rotor blade assembly for use on a helicopter. The rotor blade assembly 10 includes a pair of stainless steel abrasion strips 12 adhesively bonded to the leading edge 14 of the rotor blade 11. In the particular embodiment illustrated, the abrasion strip 12 is made of 301 stainless steel. The strip is mounted to an aluminum rotor blade 10 using a typical epoxy adhesive 13. Typically prior to the placement of the abrasion strip 12 to the rotor blade 10 the surface of the rotor blade 11 is acid anodized. Thereafter an appropriate adhesive 13 is placed therebetween and the abrasion strip is bonded thereto as shown in FIG. 3.

Figure 4:
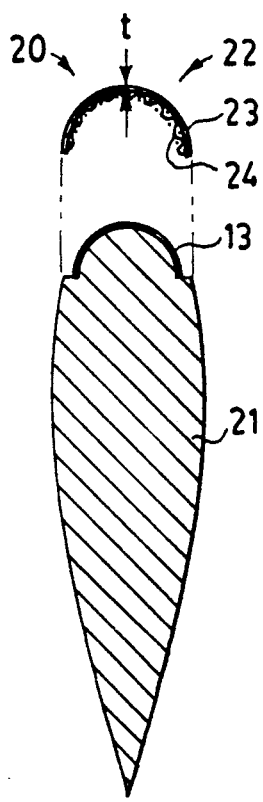
FIG. 4 is an exploded cross-sectional view of a rotor blade having an abrasion strip made in accordance to the present invention.
Figure 5:
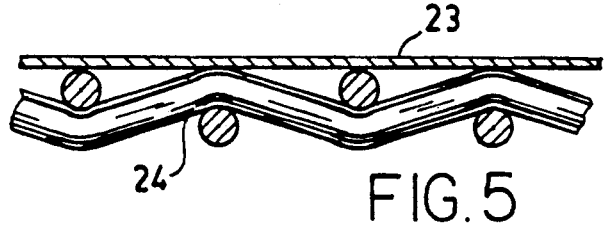
FIG. 5 is a cross-sectional view of the abrasion strip prior to it being shaped.
Figure 6:
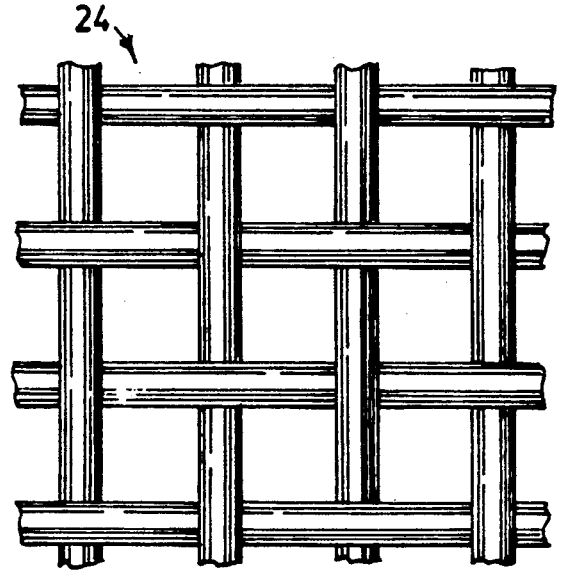
FIG. 6 is partial top plan view of the mesh of abrasive strip of FIG. 5.

Referring to FIG. 4 there is illustrated a rotor blade assembly 20 having an abrasion strip 22 made in accordance with the present invention which is to be bonded to the aluminum blade 21. The abrasion strip 22 includes a foil 23 and a woven steel mesh 24 bonded to the inside surface of the abrasion foil 24. Preferably, the stainless steel mesh 24 is diffusion bonded to the foil 23 and configured to the desired shape. In the particular embodiment illustrated the foil 23 and mesh 24 are made of 301-½ hard stainless steel. The foil 23 has a thickness t selected so as to provide the required strength for its intended use. In general, it has been found that the foil 23 should have a thickness t ranging from 0.005" to 0.050". Preferably, the foil thickness t for tail rotor application is in the range of 0.016" to 0.04". In the particular embodiment illustrated the thickness t of the foil 23 is about 0.032" for a tail rotor helicopter blade.

The size of mesh 24 and the size of the wire used is also a function of its intended use. Applicant has found that a mesh size in the range of 20 to 100 is desirable, preferably in the range of 40 to 60. In the particular embodiment illustrated, the mesh 24 is 60 and is of a plain square weave construction. However, it is to be understood the mesh size and type construction may varied as desired.

The mesh 24 is made using a wire having a diameter D which generally depends upon the particular mesh selected. For example, for a preferred wire having a 0.016 inch (0.406 mm) diameter D would be used for a 20×20 mesh; a 0.01 inch (0.25 mm) diameter wire for a 40×40 mesh; a 0.0065 inch (0.165 mm) diameter wire for 60×60 mesh and a 0.045 inch (1.143 mm) diameter wire for 100 mesh. It is, of course, understood the diameter of the wire for the mesh 24 can be altered as needed in the warp and fill of the mesh. Preferably, wire crimp for the weave includes inter-crimp and double crimp.

The mesh 24 and foil 23 is typically pre-assembled and preformed prior to assembly to rotor blade 21 as previously discussed, mesh 24 is preferably diffusion bonded to foil 23. The diffusion bonding process is a well known process by those skilled in the art. An example of a diffusion bonded mesh 24 bonded to a foil 23 may be obtained from Michigan Dynamics, a subsidiary United Technology. The abrasion strip 22 is configured in such manners so as to conform to the leading edge of rotor blade 21 as is customary in the prior art. First the abrasion strip 22 would be subjected to a solvent in order to clean any oils or residues present thereon. A typical solvent would be an ethylene chloride. Thereafter, the area to which the strip 22 is to be placed is subjected to a phosphoric acid and anodizing treatment. This is done to clean the surface of blade 21. Thereafter, the rotor blade 22 and abrasion strip 22 are primed with a chromated epoxy primer to a thickness T in the range of about 0.0005-0.0015 inch (0.0127 mm-0.0381 mm), the primer is then allowed to dry. Typically, this is done at a 120° C. for approximately 1 hour. Thereafter an adhesive 28 is applied to the surface of the blade 21. A commercially available and acceptable adhesive is an epoxy resin sold under the FM-73 and FM-123 product code as manufactured by American Cyanimid of New Jersey. These adhesives are examples of modified, B stage, epoxy adhesive resins, which are typically used in the aerospace industry for bonding. However, any other appropriate adhesive may be used. Thereafter, an adhesive such as the FM-73 adhesive, is applied to the surface of the rotor blade 21. The abrasion strip 22 is then placed against the rotor blade 21 in its proper position. The adhesive is then allowed to cure. Preferably pressure is applied between the strip and blade. This can be accomplished by placing a vacuum bag around the rotor blade 21 and strip 22 and a vacuum of approximately 30 inches is drawn. Thereafter the rotor blade 21 and strip 22, with the vacuum bag, are placed in an autoclave at 250° F. for approximately 4 hours at 100 PSI. The pressure in the vacuum bag may be released as the pressure in the autoclave is provided. After curing of adhesive 28 and the abrasion strip 22 is firmly adhered to the rotor blade 21. The mesh 24 of strip 22 provides for a mechanical interlock between the cured adhesive and wire and provides greater surface area for bonding of the adhesive thus providing an greater bond strength between the strip 22 and blade 21.

It is to be understood that various modifications can be made without departing from the scope of the present invention. For example any desired adhesive may be used that is capable of providing the strengths necessary to bond the abrasion strip to the rotor blade. Additionally, depending upon the material selection of the rotor blade 21 and abrasion strip 22 various treatments and cleaning process may need to be varied to accommodate such materials. The abrasion strip of the present invention may be applied to blades of various materials, for example, but not by way of limitation, composite, fiberglass, and graphite blades. Surface preparation for such materials may comprise grit blasting the area to be bonded so as to obtain a substantially matt finish and then using a solvent wipe, such as methylene chloride, to wipe away any residue that may be present. While the present invention is particularly suited for helicopter tail rotor blades, the present invention may be applied to other rotor blades, for example but not limited to, fixed wing aircraft propellers. The present invention being limited by the following claims.

I claim:

1. A method for providing a protective layer to the forward surface of an aircraft blade comprising the steps of:
    (a) providing a protective layer made of a metal foil and a woven steel mesh bonded to the inside surface of said foil so as to form a bonded foil mesh assembly;
    (b) cleaning said bonded foil mesh assembly to remove any oils or residues present thereon;
    (c) preparing the area of the blade on which said bonded foil mesh assembly is to be applied;
    (d) applying an adhesive to said bonded foil mesh assembly and/or rotor blade;
    (e) applying said protective bonded foil mesh assembly to said blade; and
    (f) allowing said adhesive to cure.

2. A method according to claim 1 wherein after said protective bonded foil mesh assembly is applied to said blade, pressure is applied to the blade and protective bonded foil mesh assembly for a pre-selected period of time.

3. A method according to claim 2 further comprising the steps of subjecting said blade and bonded foil mesh assembly to an elevated temperature for a pre-selected period of time so as to cure said adhesive.

4. A method according to claim 3 wherein said blade and bonded foil mesh assembly is placed in an autoclave.

5. A method according to claim 2 wherein pressure is applied by the use of a vacuum bag.

6. A method according to claim 1 wherein the surface of said blade is prepared by acid etching the surface.

7. A method according to claim 1 wherein the surface of said blade is prepared by an anodizing treatment.

* * * * *